(12) United States Patent
Saint

(10) Patent No.: US 9,261,334 B1
(45) Date of Patent: Feb. 16, 2016

(54) BALLISTIC RESISTANT AND SELF-REPAIRING STRUCTURES FOR RAIL CARS AND LIKE END USES

(71) Applicant: Brandon Saint, Tallahassee, FL (US)

(72) Inventor: Brandon Saint, Tallahassee, FL (US)

(*) Notice: Subject to any disclaimer, the term of this patent is extended or adjusted under 35 U.S.C. 154(b) by 155 days.

(21) Appl. No.: 14/196,748

(22) Filed: Mar. 4, 2014

(51) Int. Cl.
| F41H 5/02 | (2006.01) |
| F41H 5/24 | (2006.01) |
| B32B 37/18 | (2006.01) |
| F41H 5/04 | (2006.01) |

(52) U.S. Cl.
CPC ........ *F41H 5/24* (2013.01); *B32B 37/18* (2013.01); *F41H 5/0478* (2013.01); *B32B 2571/00* (2013.01); *B32B 2607/02* (2013.01)

(58) Field of Classification Search
CPC ......... F41H 5/24; F41H 5/0478; B32B 37/18; B32B 2571/00; B32B 2607/02
USPC ....................................................... 89/36.02
See application file for complete search history.

(56) References Cited

U.S. PATENT DOCUMENTS

| 4,104,438 A * | 8/1978 | Angelo .................... B05D 1/60 427/255.23 |
| 6,119,575 A * | 9/2000 | Dragone ............... F41H 5/0485 2/2.5 |
| 6,323,145 B1 * | 11/2001 | Popper ............... A41D 31/0061 428/902 |
| 2008/0092731 A1 * | 4/2008 | Hall ...................... B29C 70/086 89/36.04 |
| 2009/0145288 A1 * | 6/2009 | Thurau .................... F41H 5/04 89/36.02 |
| 2013/0011623 A1 * | 1/2013 | Jones ..................... D03D 11/02 428/160 |
| 2013/0019742 A1 * | 1/2013 | Lecarpentier ....... E04B 1/34321 89/36.02 |
| 2013/0055882 A1 * | 3/2013 | Egres, Jr. ................. D04C 1/02 89/36.02 |

* cited by examiner

*Primary Examiner* — Samir Abdosh
(74) *Attorney, Agent, or Firm* — Hulsey Hunt & Parks, P.C.

(57) ABSTRACT

A low-weight rupture/ballistics resistant wall structure is provided. Such a structure includes a multi-layer composite of at least two triaxial quasi three-dimensional woven fabrics, each coated with a specific depth of a polyurea material. Additionally, each fabric layer may be impregnated with an epoxy material to retain the triaxial configuration during utilization. Such a composite is adhered to a steel or other type of metallic base to provide improved strength to the base structure without significantly increasing the overall weight thereof. In such a manner, the inventive composite mitigates against undesirable rupture or other compromise of the overall metal structure during a destructive event and even permits reliable resealing of any created opening therein as a result of such an occurrence. The process of manufacturing the composite as well as the method of providing increased ballistic protection are also encompassed within this invention.

5 Claims, 1 Drawing Sheet

| Material | Thickness (in) |
|---|---|
| Q3D/PU/Q3D/PU | |
| | 0.25 in PU |
| | Q3D triaxial weave |
| | 0.25 in PU |
| | Q3D triaxial weave |
| | TC128 |

FIG. 1
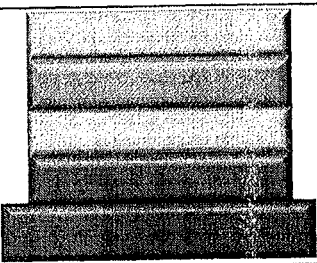
FIG. 2 (COMPARATIVE)

BALLISTIC RESISTANT AND SELF-REPAIRING STRUCTURES FOR RAIL CARS AND LIKE END USES

FIELD OF THE INVENTION

A low-weight rupture/ballistics resistant wall structure is provided. Such a structure includes a multi-layer composite of at least two triaxial quasi three-dimensional woven fabrics, each coated with a specific depth of a polyurea material. Additionally, each fabric layer may be impregnated with an epoxy material to retain the triaxial configuration during utilization. Such a composite is adhered to a steel or other type of metallic base to provide improved strength to the base structure without significantly increasing the overall weight thereof. In such a manner, the inventive composite mitigates against undesirable rupture or other compromise of the overall metal structure during a destructive event and even permits reliable resealing of any created opening therein as a result of such an occurrence. The process of manufacturing the composite as well as the method of providing increased ballistic protection are also encompassed within this invention.

BACKGROUND OF THE INVENTION

Rail cars and tanker trucks, among other transportation vehicles, have been utilized to carry and store myriad items and materials to facilitate unlimited types of commercial activities. From building materials, to gasoline, to chemicals, without such shipping alternatives, the ability for manufacturers to function within different economies would be drastically effected. As it is, there have been few, if any, other transportation methods developed and made available to replace these standard vehicles. The continued utilization of such transportation modes remains unabated and will even grow as population numbers increase.

Such vehicles, though important for commercial enterprise, remain highly susceptible to a number of concerns related primarily to the potential compromise in structural integrity thereof during actual utilization. For instance, volatile chemicals and fuels, as well as highly toxic chemicals are typically transported by rail and tanker truck to myriad destinations. Any compromise of the structure of such a car or tank could lead to highly undesirable spills and even explosions due to any number of actions. If a train is derailed, the chances for spills, emanations, or omissions of fluids and/or gases are currently not only highly likely, but imminently lead to disastrous results. The same holds true for tanker trucks; collisions, jack-knifing, or, other types of accident lead to environmental and other hazardous events that have been known to deleteriously effect individuals involved in such a situation as well as those proximally located to the site itself. Even more horrifying is the chance that a bad actor seeks to discharge a ballistic device on a rail car or tanker truck during transport of hazardous materials. If the materials involved are flammable, the creation of a spark through the contact of the ballistic shell with the metal structure could cause nearly instant immolation of the rail car or tanker (as well as the loss of life in such a vicinity). Even if such an explosion does not occur (or if the materials transported are not flammable, but highly toxic, as an example), the chances for fluid or gaseous materials to escape the rail car or tanker enclosure to the environment in such an instance are significant. Either way, the potential for problems in this manner are very high.

To meet these issues, many different developments have been considered in the past. Certainly, the ability to thicken rail car and tanker walls has been undertaken to strengthen the structures to reduce the propensity for wall failure during an accident or other problematic event. Unfortunately, to do so requires not only the expenditures of greater funds to purchase larger amounts of steel (or other like metal materials) as well as the increased manufacturing costs to produce such resultant bolstered metal objects. As well, the increased weight accorded the finished cars and tankers adds to the fuel consumption necessary to actually transport such devices the requisite distances. In other words, although greater strength could be provided through extra steel (or other like metal) layers, even in terms of intricate layering techniques, the base costs and the overall weight added militate against such an alternative. Even with these strengthened wall units in place, the capability of a ballistic device to create a spark upon breach thereof would cause a spark that would, in turn, cause any flammable materials to explode therein. There thus remains a significant need to avoid such costly and, ultimately, ineffective means for all possible difficulties (ballistic shooting, derailing, crashing, and the like) such transport modes could face.

Other developments have thus been proposed to avoid such challenges. For example, the utilization of polyurea as a layering coating over and between steel layers has provided greater strength as well as some degree of spark dissipation in certain situations. Polyurea has shown to be relatively effective to combat structural integrity failures in other end-uses and thus its use as a layering component has shown some promise within metal wall composites. The major deficiency, however, involved with this layering objective is that the retention of polyurea on such steel (or other like metal) surface is highly suspect; delamination is a typical result, in other words, as the polyurea resin does not easily remain adhered to such metal surfaces during a ballistic event. Even with an epoxy binding agent, the failure point exists at the epoxy-metal or epoxy-polyurea interfaces, leaving the finished wall susceptible to failure upon a bullet strike since any compromised interface will prevent the operation of polyurea to re-seal at the point of rupture. Additionally, the need for polyurea between layers requires extra metal materials that, again, add to the overall weight and costs of manufacture. Thus, the lack of full reliability for rupture sealing at each point within the wall structure coupled with the extra costs/weight, as above, militate against this seemingly simple remedy.

Unfortunately, the standard procedures to reduce the need for other metal layers and/or the potential for delamination of polyurea from composite layers has proven ineffective as well. For example, the theory that stronger fabrics, such as two-dimensional and three-dimensional weaves, that exhibit individual levels of tensile strengths on par, at least, with basic thin-wall metal structures, and sometimes dependent on the fiber types utilized, has been proposed for such rail cars and tankers. The basic problem, though, remains that such fabrics must not only exhibit the necessary rupture prevention (or at least reduction) capability, but also the ability to remain properly laminated to the polyurea materials during and after a destructive event. Such standard weaves, though, have not proven reliable enough to the necessary degree. Even with polyaramid and other like ballistics fibers, the weakest link within the overall composite structure, such as the resin layers between woven fabrics, have proven to be ineffective with certain high-force destructive events. Polyurea can be coated on such fabric surfaces, but the individual layers between fabric portions create a resin-rich environment that is highly susceptible to delamination upon ballistics penetrations. In such situations, the polyurea component will not be able to re-contact effectively thereafter to re-seal a resultant opening within the base structure. Furthermore, the need to layer multiple weaves on one another to accord the necessary thickness and strength to the finished wall structure leaves the composite involved highly susceptible to detachment (or, again, delamination) of individual layers such that rupture failure is imminent. Unless the multi-layered structured remains intact, the ability of the structure to impart the necessary rupture prevention (or reduction) is compromised, in other words. Additionally, such weaves are typically of standard configurations (basket weaves, for instance) that fail to provide the strongest tensile strength results to the overall product. Even with polyurea applied thereto, then, the potential for composite fabric failure prevents the polyurea, even if its lamination thereto is not compromised, from properly operating during a ballistic or other destructive event.

Thus, the next step undertaken was to investigate the potential for quasi three-dimensional fabric weaves as structural composites. Such quasi 3D fabrics are far less susceptible to damage and delamination of layers due to the presence of connecting fibers between layers to effectuate greater levels of strength between individual structures. In other words, with 3D fabrics, there are multiple layers that are fused together in some manner, but still highly susceptible to delamination during a shearing event (such as, again, a crash, ballistics penetration, or other like destructive scenario). Quasi 3D structures include multiple layers but are actually configured such that a middle layer includes fibers that are integrated within both the upper and lower layer. This outlay then creates far greater strength for the overall fabric as the chances of layer separation are drastically reduced. Combination with polyurea may then allow for a certain improved level of reliability over the past developments. Unfortunately, however, the actual weave configurations integrated within these quasi 3D structures have been lacking the overall strength needed to comport the highest level of protection from a rupture action. Simply put, even with a structure that does not easily come apart in layers during such an event, the base weave configuration itself leaves the potential for overall rupture of the fabric itself, rather than just delamination or separation of layers. Again, even with polyurea properly applied thereto, and thus the potential, at least, for a resealing action to commence immediately upon rupture or ballistics penetration, if the fabrics themselves rupture to great a degree, then the overall platform is weakened and may allow for gas, fluid, etc., escape thereafter.

Thus, there remains a significant need to provide as failsafe a structure to adhere to a base metal wall in order to accord a resealing method thereto that acts instantaneously upon compromise of any portion of such a strengthened wall. Again, without a fabric that provides not only high-strength protection to absorb destructive forces upon a quick, possibly deliberative and penetrative collision or ballistic event to a subject metal wall structure, and without a properly applied resealing polyurea material that will not only aid to absorb destructive forces but will also reseal and cover the resultant opening within the subject wall during such an event, there is simply lacking the necessary level of reliability and effectiveness for proper protection in this situation. To date, again, there is nothing provided the pertinent industries to such a needed level.

ADVANTAGES AND SUMMARY OF THE INVENTION

One distinct advantage of the inventive composites are the resiliency and strength imparted thereby to metal structures, particularly in terms of absorbing at least the forces of 0.50 caliber munitions fired within 25 feet and resealing instantaneously thereafter to prevent or drastically reduce any emissions or leaks of gases or fluids therefrom. Another advantage is the simplicity in providing at least two layers of the requisite quasi three-dimensional fabric weave structure with polyurea layers in between all such layers, for adherence to a metal wall structure to impart the necessary resiliency and strength characteristics thereto. Another advantage of the inventive composite is the rigidity of the individual fibers within the fabric layers to exhibit stretching rather than shearing during a ballistics event combined with a certain degree of flexibility of the multi-layers to permit the polyurea constituent layers to substantially instantaneously reseal subsequent to such an occurrence.

Accordingly, the invention encompasses a multilayer composite including at least two layers of a triaxial weave quasi three-dimensional fabric and at least two layers of polyurea with at least one such polyurea layer disposed between said at least two fabric layers and one polyurea disposed external to said triaxial weave quasi three-dimensional fabrics. Also encompassed within this invention, is the same composite with an epoxy material impregnated within said fabric layers. Additionally, the invention encompasses a metal wall structure including a base external metal material to which said composite is adhered directly to one layer of said triaxial weave quasi three-dimensional fabric. The method of applying such a composite to a metal wall structure is also encompassed herein.

The invention is directed to a puncture and ballistic resistant composite. As utilized herein, the term "ballistic resistant" generally refers to a material that is resistant to penetration by ballistic projectiles. Thus, a "ballistic resistant" material can either prevent penetration of the material by a ballistic projectile or can lessen the degree of penetration of such ballistic projectiles as compared to similar, non-ballistic resistant materials.

The inventive composite requires two base components, the first being at least two separate multi-layer triaxial weave quasi three-dimensional fabrics and the other at least two separate polyurea layers. The required fabric components may also be impregnated with an epoxy material to provide resiliency to the weave structure in order to retain the angled fibers in place during utilization. Such fabrics are multi-layer in structure themselves with, for example, distinct weave levels with strata in multiples of three. In such configurations, the quasi three-dimensional structure is accorded through weaving connecting fibers between the first and second levels and the second and third levels, creating, in essence, structures that do not have complete defined borders between each level. In this manner, the chances for delamination or separation between each fabric level are reduced dramatically from a true three-dimensional structure that would have three layers laid one on top of the other. Additionally, the weave structure is preferably isoplanar in geometry providing a configuration that will have the same tensile strength properties in each direction. Furthermore, the ability to provide a quasi 3D basis for the fabric also accords a structure that does not include large crimp angles within the individual fibers (which are typically present within true 3D woven fabrics in order to attain the three-dimensional structures). This avoidance of large fiber crimp angles further increases the overall load the fabrics can undertake when in finished composite form, allowing for the ability, coupled with the isoplanar structure of the weave itself, to stretch rather than shear when exposed to sudden high impact ballistic penetration at any location. In fact, transverse impact resiliency is directly related to the inverse of the crimp within a fabric's fibers, thus providing further evidence of the strength increase created with this quasi 3D structure. Additionally, due to the unique weave configuration, such a fabric is infinitely repeatable in its thickness direction, further increasing the overall strength (particularly in comparison with true 3D woven articles). Again, this stretch capability, rather than the potential to withstand high shear damage, not only permits continued utilization of the base fabric multiple times after being subjected to a ballistic event, but the stretch feature surprisingly contributes to the highly desirable utilization of a polyurea material that can flex with the stretch membrane and remain substantially in place at the point of ballistics penetration. More succinctly, perhaps, is that the woven fibers pass over and under one another, thus increasing not only the tensile strength of the entire fabric (and thus composite), but also induces such transverse loads as any crimped fibers attempt to straighten. Thus, the quasi triaxial 3D woven fabrics accord distinctly stronger and different load profiles than standard quasi 3D, true 3D, or 2D fabric counterparts.

The viscoelastic properties of the polyurea can then substantially instantaneously reseal when provided in such a continuously connected fashion, further increasing the reliability of the overall composite to prevent rupture and escape of material from within a properly treated metal enclosure. This membrane stretching capability has unexpectedly provided the basis for the inventive composites and finished metal structures. As such, the utilization of a quasi three-dimensional triaxial woven fabric has not only been heretofore unexplored within the realm of ballistics protective structures, but such materials in conjunction with polyurea have yet to be considered in such end uses.

The required triaxial quasi three-dimensional fabric is produced through any available triaxial method. The term "triaxial" is intended to encompass a structure that includes multiple angles within the weave itself and a final appearance of inserted fibers having three different angled configurations. Preferably, the provided fabric has quasi isotropic properties with two repetitive weave directions disposed 60° from a single intersecting fiber. Thus, with the standard intersecting fiber (at 0°) and the other two at 60 and −60°, respectively, the triaxial formation is in place. Weaving multiple initial layers with connecting fibers between the first and second, second and third, and so on, thus provides the needed quasi three-dimensional properties to the overall structure. Preferably, as well, the triaxial fabric has at least 9 total layers, with each individual base quasi 3D base having three layers each and at least 3 total strata of each three-layer base structure incorporated therein with the same quasi weaving result. Furthermore, the yarns or fibers of the triaxial woven structure can comprise any suitable fibers. Yarns or fibers suitable for use in the textile layer generally include, but are not limited to, high tenacity yarns or fibers, preferably monofilament or multifilament types, which refers to yarns that exhibit a relatively high ratio of stress to strain when placed under tension. In certain possibly preferred embodiments, the yarns or fibers of the triaxial textile layers comprise fibers selected from the group consisting of polyolefin fibers, carbon fibers, polyaramid fibers, and other synthetic fiber types. More specifically, such fibers may be selected from the group consisting of gel-spun ultrahigh molecular weight polyethylene fibers, melt-spun polyethylene fibers, high-strength polypropylene fibers, melt-spun nylon fibers, melt-spun polyester fibers, sintered polyethylene fibers, aramid fibers, PBO fibers, PBZT fibers, PIPD fibers, poly(6-hydroxy-2-napthoic acid-co-4-hydroxybenzoic acid) fibers, carbon fibers, and combinations thereof.

In order to provide adequate protection against ballistic projectiles, the yarns or fibers of the textile layers typically have a tenacity of about 8 or more grams per denier. In certain possibly preferred embodiments, the yarns or fibers of the triaxial woven structure can have a tenacity of about 14 or more grams per denier, as well. As such, fibers suitable for use within the triaxial quasi 3D woven fabric include, but are not limited to, as alluded to above, fiberglass, such as X-STRAND® S fibers from Owens Corning, fibers made from highly oriented polymers, such as gel-spun ultrahigh molecular weight polyethylene fibers (e.g., SPECTRA® fibers from Honeywell Advanced Fibers of Morristown, N.J. and DYNEMA® fibers from DSM High Performance Fibers Co. of the Netherlands), melt-spun polyethylene fibers (e.g., CERTRAN® fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kans.), sintered polyethylene fibers (e.g., TENSYLON® fibers from ITS of Charlotte, N.C.), and multifilament polypropylene fibers (e.g., INNEGRA® fibers from Innegra Technologies, Greenville, S.C.). Suitable fibers also include those made from rigid-rod polymers, such as lyotropic rigid-rod polymers, heterocyclic rigid-rod polymers, and thermotropic liquid-crystalline polymers. Suitable fibers made from lyotropic rigid-rod polymers include aramid fibers, such as poly(p-phenyleneterephthalamide) fibers (e.g., KEVLAR® fibers from DuPont of Wilmington, Del. and TWARON® fibers from Teijin of Japan) and fibers made from a 1:1 copolyterephthalamide of 3,4'-diaminodiphenylether and p-phenylenediamine (e.g., TECHNORA® fibers from Teijin of Japan). Suitable fibers made from heterocyclic rigid-rod polymers, such as p-phenylene heterocyclics, include poly(p-phenylene-2,6-benzobisoxazole) fibers (PBO fibers) (e.g., ZYLON® from Toyobo of Japan), poly(p-phenylene-2,6-benzobisthiazole) fibers (PBZT fibers), and poly[2,6-diimidazo[4,5-b:4',5'-e]pyridinylene-1,4-(2,5-dihydroxyl)phenylen-e]fibers (PIPD fibers) (e.g., M5® fibers from DuPont of Wilimington, Del.). Suitable fibers made from thermotropic liquid-crystalline polymers include poly(6-hydroxy-2-napthoic acid-co-4-hydroxybenzoic acid) fibers (e.g., VECTRAN® fibers from Celanese of Charlotte, N.C.). Suitable fibers also include carbon fibers, such as those made from the high temperature pyrolysis of rayon, polyacrylonitrile (e.g., OPF® fibers from Dow of Midland, Mich.), and mesomorphic hydrocarbon tar (e.g., THORNEL® fibers from Cytec of Greenville, S.C.).

The yarns or fibers of the textile layers can have any suitable weight per unit length (e.g., denier). Typically, the yarns or fibers have a weight per unit length of about 50 to about 5,000 denier. In certain possibly preferred embodiments, the yarns or fibers have a weight per unit length of about 100 to about 1,500 denier.

The triaxial formation of the woven fabric is of utmost importance, as noted above, to impart the necessary strength to the overall finished composite. The ability to withstand shear stresses during a ballistic event is accomplished through the combination of all the material involved, certainly, but the necessity of the fabric layers to retain its structure, particularly in terms of the actual woven configurations, allows, ultimately, for the polyurea materials to remain in close enough proximity to reconstitute upon penetration by a bullet, slug, etc. To that end, then, it is preferable to impregnate the woven fabric layers with stiffening agents, such as epoxy resins, as one potentially preferred, non-limiting example. These agents (resins) permit molding of the fabric portions and to provide a suitable matrix for the fibers to remain in place prior to any possible ballistic event and thus to provide desirable resiliency to the fabrics if such an event actually occurs.

Such agents (resins) are first produced through mixing with a hardener. Such a process typically generates small bubbles within the mixture that require degassing for removal prior to actual implementation with the woven fabric. Care must be taken to ensure placement within a degassing chamber does not result in too high a negative pressure exposure (for too long a period of time) as this could create larger bubbles within the formed epoxy formulation. Subsequent to a proper degassing step, then, the finished epoxy can then be incorporated (impregnated) within already woven fabric through the utilization of a Vacuum Assisted Transfer Molding (VARTM) process. The epoxy/hardener is applied to the entirety of the subject fabric surface, whereupon the epoxy is allowed to cure, first to gel at room temperature and then placed, as impregnated fabric, within a controlled oven. A curing cycle ramps from room temperature to 250° F. at a rate of 3° F./minute and held at the final level for four hours. Thereafter, the temperature gradually decreases to room temperature. The molded fabric can then be utilized as a component within the inventive composite structure with polyurea materials.

In terms of possible epoxy formulations that can be utilized in this respect, CCMFS2 is the preferred, a combination of SC-15 and SC-79, available from American Poleramic, Inc. Other possible materials include any other two-part epoxies.

As alluded to above, polyurea, as a general description, is an elastomer that exhibits high resiliency and large strain capacity, as well as high elongation, high tear strength, and a superior modulus of elasticity. Such a material has primarily been utilized within spray coating applications, due primarily to its fast-curing nature, particularly for providing effective moisture and chemical barriers for concrete and steel materials, for instance, as well as for additives within joint fillers and caulks, abrasion resistant surfaces (such as within spray-on truck bed liners), chemical protective coatings for storage and/or delivery tanks, fire resistant coatings for building walls, as examples. When utilized in ballistic protection articles, such a material has proven highly effective at absorbing high energy levels as well as preventing debris escape and/or penetration.

The term "polyurea" herein is broadly intended to encompass an elastomer material that is derived from the reaction product of an isocyanate and a synthetic resin blend through step-growth polymerization. Generally, the isocyanate component may be aliphatic or aromatic in nature, and may be monomeric, polymeric, or otherwise a reaction variant of an isocyanate, a pre-polymer, or a quasi-polymer. Additionally, the pre- or quasi-polymer may be an amine- or hydroxyl-terminated polymer resin. The reactant resin blend may include amine-terminated polymer resins and/or amine-terminated chain extenders. If it is an amine-terminate polymer resin, then it will be free of hydroxyl moieties. The resin blend may also include carious additives (or non-primary components, as well), including, without limitation, pigments (describe polyurea materials available), particularly within a polyol carrier, and other hydroxyl-based compounds.

Such a material is preferably produced at the source of application, for instance at a point external to a high pressure spray gun, in order to ensure effective polyurea production occurs with minimal clogging of the spray gun orifice, if at all, and a sufficiently high pressure is implemented thereto to ensure effective application to a target fabric or metal wall surface. The polyurea reactants are mixed at a substantial 4:1 ratio of total weight of each component at a high temperature 80° Celsius, this allows for easier handling and slightly longer pot life in the manner noted above.

Polyurea itself is generally constituted of different chain segments in relation to its reactants. Basically speaking, polyurea monomers are the reaction products of organic amines and organic isocyanates; upon polymerization the resultant chains exhibit hard segments associated with urea linkages and soft segments pertaining to the remaining amines. The hard segments exhibit high glass transition temperature levels while the soft segments lower properties in that respect. The overall polyurea chain thus is an alternating linear arrangement of such hard and soft segments. The hard segments (urea linkages) tend to strongly adhere to one another through strong hydrogen bonding, particularly when the chains arrange themselves in space. This allows for hard segment segregation with small levels of soft segment presence therein, creating microstructural levels of hard structural domains. The sequestered soft segments then tend to coalesce together forming soft domains within the overall structure. This complex microstructure creates a number of important and diverse mechanical properties, particularly under static and dynamic loading conditions. Most pertinent is the ability of such a polymer to harden under applied loading force and to alter or disperse shock waves and thus absorb kinetic energy associated with contact with ballistic projectiles. The capability of these materials to sustain such high end, high force events also permit's a reduction in deformation of the overall polymer structure, as well. Such a viscoelastic characteristic overall is thus highly desirable in ballistic protection methods and operations. Unfortunately, the level of ballistics protections is related primarily to different manufacturing modifications (temperature, amine/isocyanate levels, moisture exposure, ultraviolet exposure, etc.). The ability to otherwise modify the physical characteristics of the viscoelastic polyurea materials has been unexplored, with the potential for microstructural changes (such as nanoreinforcements, for example) a potentially significant alternative in this respect. Such microlevel modifications would accord, theoretically, at least, inhomogeneities within the overall structure that could impart localized mechanical properties that would be different than overall bulk characteristics. As such, there are certainly other issues that may arise with regard to polyurea utilization in the future; for the present combination with triaxial woven quasi three-dimensional fabrics, however, the utilization of any suitable high strength polyurea may be undertaken.

The composite of polyurea layers and triaxial woven quasi three-dimensional fabrics are produced through the initial production of the fabrics (with, preferably, the impregnation with epoxy) then the subsequent coating and curing of the polyurea on the surfaces thereof. With the layered structure of the composite, a first fabric layer is then spray-coated with polyurea, then this initial composite is adhered to a second fabric layer that is then spray-coated, as well, with the polyurea materials. The entire composite is then cured to solidify the polyurea and harden the overall structure.

Such a composite is then adhered to a metal substrate in order to impart improved structural strength thereto. Any type of metal may be included for such a purpose, although, for ballistics protection purposes, the target metal substrate would be any type that is utilized within typical rail car or tanker wall constructions. The standard steel for these railcar and tanker end-uses is TC-128, a material well known for its toughness and resiliency (again, though, this invention may be utilized in conjunction with any type of metal for ballistics protections). The actual strength characteristics of this rail car steel standard is highly confidential and unavailable, except that samples used herein of 12×12 inches with a depth of 0.75 inches in dimension had an areal density of 0.218 lb/in² and a Hardness measurement of 53 Rockwell C. Such specific samples allowed for proper small sized composites to be produced and formed and suitable ballistics tests to be performed thereon. The metal substrates were appropriately joined to the fabric/polyurea composites through adherence of an external polyurea layer to the metal substrate (particularly when the polyurea is highly adhesive for such a purpose. As discussed in greater detail below, such metal/composites structures can then be properly tested for overall protective capabilities.

It was determined that the triaxial woven quasi 3D fabric is effective with at least 3 internal layers per fabric layer (again, the layers of a quasi 3D fabric are connected together through interlacing fibers within each adjacent layer) and up to 9 internal layers. The polyurea was found to provide the best overall results when applied at a thickness of at least 0.25 inches, more preferably as high as 0.50 inches (the inner layer present b between the fabric layers may be from 0.10 to 0.25 inches itself). These complete composites attached to metal substrates accord excellent ballistics protections to such a metal wall without significantly increasing the overall metal substrate's weight. Additionally, the triaxial woven fabric accords excellent flexibility during a ballistic event such that shrapnel (or other residue high energy portions of fired ammunitions) will not impart any appreciable structural loss to such a specific fabric, thereby causing the polyurea to remain sufficiently in place to effectuate the necessary resealable qualities necessary to prevent penetrative damage to the fired-upon region of the subject metal substrate.

BRIEF DESCRIPTION OF THE DRAWINGS

FIG. 1 is a cross-sectional view of the composite layers when applied to a metal substrate;

FIG. 2 is a cross-sectional view of a comparative system applied to a metal substrate;

DETAILED DESCRIPTION OF THE DRAWINGS AND PREFERRED EMBODIMENTS

The embodiments provided below as preferred types of the instant invention should not be construed as limiting the scope of the entire invention to any degree. As well, the accompanying drawings are not intended as specific limitations required of the instant invention.

The overall inventive composite includes, as noted above, an epoxy impregnated triaxial woven quasi 3D fabric, a polyurea, and a metal substrate. The manufacturing processes for the fabric and polyurea constituents are discussed below as preferred embodiments (the metal substrate, TC-128, again, in preferred format, is provided by manufacturers and the specific materials and other details are confidential for security purposes).

Triaxial Woven Quasi Three-Dimensional Fabric Formation

As noted above, the preferred fiber utilized for the fabric was X-STRAND S with a 17 micron 1200 tex roving. The fabrics utilized for testing and analysis were woven by hand with this material. As alluded to above, the angles of the intersecting fiber (three axes thereof) were disposed at 0, 60 and −60°. Such a configuration provided the necessary quasi isotropic properties of the finished product, having three sheets consisting of three layers each (thus 9 layers in total). Specific fiber strands are introduced at the disposed angles, as noted above, with a first set (referred to as B1 fibers) running above a second set (B2 fibers), but below a third set (B3), the B2 fibers running above the B3 fibers, but below the B1 fibers, and the B3 fibers running above the B1 fibers and below the B2 fibers. Upon completion of a single woven layer, all fibers are 60° from one another, and the weave creates hexagonal gaps that measure twice as long as the each fiber's thickness. This initial layer is thus the base for the finished triaxial weave fabric. Subsequently, then, a further step is employed to introduce fibers that run through this base layer but also remain primarily part of a second layer. In the preferred embodiment, the second set of fibers for the second layer (hereinafter U2 fibers), were employed as the base layer connection strands. These U2 fibers are introduced within the weave to the space directly to the left of the B2 fibers are woven below all B3 fiber strands, forming the basis for the second (upper) layer. A third set of fibers (analogous to those for the base layer) (referred to as U3 fibers) are woven into the initial structure a space away from the B3 fibers, but running below all U2 fibers within the higher layer. A first set of fibers (as well, analogous to the B1 fibers, above) are then inserted to run below the U3 fiber strands, and above the U2 fibers and all of the B1, B2, and B3 fiber strands. This is then repeated to create a third layer, either above the upper added layer or below the initial base layer. In such manner, then, a second set of lower layer fibers (L2) are woven below the U3 fibers strands and above all of the other fiber strands. The third layer third set of fibers (L3, analogous to B3 and U3 fibers) is woven below the L2 fibers and above all other fibers, and this third layer first set of fibers (L1, again, analogous to B1 and U1 fibers) are woven below L3 fibers and above all others. The final structure thus has a constant thickness since it has individual layers that are always divisible by three. Also constant in this situation is that the three-layer structure will also include a 9-fiber thickness over its entire area.

The finished product is still not ready for actual utilization due to the potential for fiber or strand manipulation during utilization. A means to prevent or at least drastically reduce such manipulation potential, ostensibly to increase the effectiveness of the finished composite by preventing fiber movement to the degree that the polyurea layer(s) will not have remain in place suitably to reseal if a projectile ballistic contacts a treated composite metal substrate wall.

To more readily keep the strands in place within the triaxial configuration, as well as to provide resilient base structures in suitable layers for incorporation with the polyurea layers, the woven fabrics are then subjected to a resin impregnation process. A vacuum assisted resin transfer molding (again, VARTM) procedure is thus utilized, particularly for the relatively small size samples produced herein. Alternatively, a wet lay-up resin impregnation step may be possibly undertaken with larger fabric sizes. In any event, a CCMFCS2 resin was utilized for this purpose, wherein a mold is provided (preferably square-shaped, 12 inch×12 inch in dimensions). Broadly speaking, the VARTM process involved the initial application of a release agent to a mold surface, placing a bottom release on the treated mold surface, placing the fabric composite on the bottom release fabric and covering the same with a top bleed release fabric, and, thereafter, covering the entire resultant composite with a vacuum bag and sealing it with gum tape.

More specifically, and, again, as one potentially preferred embodiment of the invention, an acrylic glass sheet ⅜ inch thick was used as the mold. A TREWAX coating was applied as a release agent. Such a wax agent was allowed to turn cloudy in appearance and then the excess was buffed off until the mold surface was smooth and shiny. The release agent in this situation acts to fill any surface deformations (microscratches, etc.) within the acrylic glass to prevent resin introduction therein, thereby facilitating clean up afterwards. A bottom release fabric was then laid within the mold to basically provide a roughened surface on which the composite is placed to increase surface area properties (with a slightly rough finish) to ensure suitable bonding, otherwise the resultant panel would have a high gloss finish. The triaxial weave quasi 3D fabric sample was then placed on the bottom release fabric with another bleed release fabric placed over the 3D fabric sample. In this instance, such release fabrics were configured to extend beyond the edges of the 3D fabric sample ostensibly to permit separate hoses to infuse and transfer outwardly the resin. The release fabrics, as the name suggests, aid to permit removal of the mold from the resultant composite. A final top layer is then placed over the bleed release fabric. This layer is a diffusion media to facilitate the saturation process of the resin and to create small spaces above the release fabric and 3D fabric sample, thus further facilitating escape of small air bubbles reducing the potential for such small bubbles to be present within the finished composite (which could, as discussed above, have a deleteriously effect on the overall structural integrity of the entire finished metal/fabric/polyurea composite). The entire system is then covered with a vacuum bag (cut to meet the dimensions and contours of the composite and release fabrics as well as the intake and exit hoses). The vacuum was then started and the resin was allowed to diffuse throughout the entire 3D fabric sample, with the bag properly handled so as not to crease or pleat over the composite panel (to prevent such results within the finished structure). After 36 hours the bag was unsealed and removed and the release fabrics were removed from the finished impregnated panel. The resultant structure was then in basic condition to be coated with polyurea.

Polyurea Formulation and Layer Production

The potentially preferred polyurea material consisted of particular diamine and diisocyanate reactants. The diamine was VERSALINK P-1000, an oligomer from Air Products, provided as a viscous amber liquid, with a melting point range of 18-21° C., an equivalent weight of 575-625 mmol/g, and a molecular weight of 1238 g. The diisocyanate was ISONATE 143 L from Dow Chemical, a light yellow liquid under room temperature, with an equivalent weight of 144.5 mmol/g. These reactants were then mixed at a weight ratio of 4:1 (diamine:diisocyanate). The diamine was preheated for 30 minutes and degassed before mixing with the diisocyanate (which lasts for less than one minute as the reaction is rather quick). The resultant mixture was then oven-heated at 80° C. for 30 minutes to remove any generated bubbles. The resultant heated mixture was then transferred into the composite mold (as above) and cured for 4 hours at 80° C. The resultant polyurea structure was provided at a thickness of 0.25 inch, with some comparative structures of 0.125 inch also made.

Composite Formation

The resultant fabric panel and polyurea materials were then pressed together to form a composite and then adhered to a metal substrate, herein the potentially preferred TC-128 sample. For proper comparison purposes between an untreated TC-128 blank and the inventive composite structure, as well as any other comparative composite examples, the metal TC-128 samples utilized within the composites were properly milled to provide the same areal density as the TC-128 steel plate blanks. For this purpose, 12 inch×12 inch× 0.75 inch TC-128 steel plates were utilized. With the 0.75 inch initial thickness, the composite steel samples were, as noted above, milled to meet the same thicknesses (and thus areal densities) of the blank samples with the panels/polyurea components present.

The inventive metal/composite structure consisted of a base TC-128 plate to which a 0.140 inch thick layer of a first impregnated 3D fabric panel was adhered, with a layer of 0.25 inch polyurea, another 0.140 inch fabric sample, and a second, external layer of 0.25 of polyurea had been applied previously (FIG. 1). The steel plates were milled 0.1218 inch to a final thickness of 0.631, again, to meet the same areal density measurement of the TC-128 blank itself.

A comparative structure was also produced in the same basic manner, but with a 32-layer resin-impregnated basalt fiberglass panel replacing the inner 3D fabric sample panel of the inventive example, as well as an internal layer of polyurea having a 0.125 inch thickness (FIG. 2). The steel plate for this example was also milled to the same level as above for the inventive example, thus resulting in the same areal density as for the steel blank and the inventive metal/composite structure.

The inventive and comparative structures were produced through molding procedures, providing 15 cm×15 cm square composites. Such sizes were ostensibly provided in order to best determine the V50 results for the steel portions of each separate metal/composite specimen, there by permitting better analysis of the actual improvement accorded the overall structure by separately accounting for the steel component results as well as the coating (composite) strength results. As noted above, the composites (both the inventive and comparative) were produced first and then applied to the milled steel plates. The molds themselves were of constructed of aluminum and were coated with Mylar and permitted base panel placement therein below a layer of polyurea, the second fabric panel layer (in the comparative, again, basalt fiberglass was the first layer and the second was the 3D fabric sample), and then a second layer of polyurea. After curing at 80° for 4 hours, the resultant composites were allowed to cool and then were removed. A thin layer of the same polyurea was then applied to the surface of the external fabric panel (for either the inventive or comparative panel) which allowed for adherence to the milled steel plate.

Thus, there was provided for testing purposes the inventive metal/composite structure, the comparative metal/composite structure, and a blank TC-128 steel plate, all having the same areal density measurements.

Ballistic Experimentation

Testing was then undertaken in accordance with Department of Defense Test Method MIL-STD-662F, wherein lightweight armor material performance is assessed in terms of ballistic exposure. A witness plate is placed behind the subject armor panel within such a protocol. If light is visible after a particular caliber of projectile is shot into the subject armor panel, then complete penetration exists due to perforation of the ballistic (or by other results, such as plate spall due to debris). Partial penetration is determined if no light is seen in this manner.

The value V50 is defined within this test as the acverage of an equal number of highest partial penetration viscosities and the lowest complete penetration velocity measured which occur within a specified velocity range. The witness plate itself is 0.020 inch thick and constructed of 2024-T3 aluminum and is placed 6+/−½ inches behind and parallel to the subject target (armor panel). Normally, at least two partial and two complete penetration velocities are required to computer this V50 value.

The projectile itself within the test is M33 0.50 caliber 663 grain round, the largest rifle round available to civilians without any impediments to purchase (security checks, waiting periods, etc.). Such a round has a hardened steel core that enables penetration within many different reinforced targets.

The chamber pressure of such a round averages about 55,000 psi with average muzzle velocity of 2,910 ft/s. For this test, however, the propellant was adjusted to ensure that three complete and three partial penetrations occurred for proper comparison purposes.

Four test samples, the three above, and a fourth including two layers of polyurea alone, for which the weight and dimensions of each were prior recorded for comparisons thereafter, were then mounted within an indoor firing range, 25 feet from the muzzle of a test barrel. Photoelectric screens were position at 10 and 20 feet from the sample, allowing for proper chronography to be undertaken to compute ballistic velocity 15 feet forward of the muzzle. Additionally, a lser leveling device aligned each shot for substantially uniform accuracy. As noted above, the velocities of the fired rounds were manipulated solely by the amount of propellant utilized within each cartridge of the firing muzzle device.

The witness panel was then positioned 6 inches behind and parallel to the test samples. If any round hits were evident on the witness panels, complete penetrations were evident, while dents or like deformations were due to debris and not considered complete penetrations.

The samples were then fired at by the muzzle device. An initial shot was estimated in terms of V50 values in relation to similar prior plate results. The subsequent shots were then modified for velocity in relation to the three complete and partial penetration results. The initial shot required visual inspection of the witness plate as well as the test sample for full or partial penetration, as discussed above. If full (complete) penetration occurs, then the shot velocity is set for that sample as the upper limit. The second shot would then be less than that of the first, with further shots taken until the velocity of the round led to partial, rather than complete, penetration. From there, the velocity would then be increased with each shot until a proper indication of three complete and three partial penetration resultant firings (thus, velocities) were determined. The average velocity of these six measurements thus provided the V50 value for the subject plate. For range of error reasons, the three lowest complete penetration velocity measurements and the three highest partial penetration velocity measurements were utilized for such a purpose.

In order to assess the actual composite benefits, a Coating isolated Performance (CIP) value was also determined. The V50 for the subject test sample and the V50 for the metal alone were recorded. The following equation measures this value (given in ft/s/in):

$$CIP = \frac{(V50 \text{ of sample} - V50 \text{ of metal alone})}{\text{Thickness of sample coating}}$$

Test Results

Table 1 shows the measured results for the Control TC-128 blank:

TABLE 1

| Shot # | Velocity (ft/s) | Penetration Result |
|---|---|---|
| 1 | 3240 | Complete |
| 2 | 3167 | Complete |
| 3 | 3131 | Partial |
| 4 | 3147 | Complete |
| 5 | 3149 | Complete |
| 6 | 3116 | Complete |
| 7 | 3084 | Complete |

For this standard steel sample, the following were calculated:

| High Partial | Low Complete | V50 |
|---|---|---|
| 3181 | 3041 | 3086 |

The plate was difficult to shoot to a velocity that resulted in partial penetration, showing the lack of definitive protections with the TC-128 standard thickness samples alone.

Table 2 shows the measured results for the metal/Polyurea alone test sample:

TABLE 2

| Shot # | Velocity (ft/s) | Penetration Result |
|---|---|---|
| 1 | 3140 | Partial |
| 2 | 3154 | Complete |
| 3 | 3138 | Complete |
| 4 | 3111 | Partial |
| 5 | 3151 | Complete |

For this comparative metal/polyurea sample, the following were calculated:

| High Partial | Low Complete | V50 |
|---|---|---|
| 3140 | 3138 | 3134 |

The plate was shot six times until the appropriate range of velocities for V50 value determination could be made. The polyurea attempted to self-sealed after impact, but the copper jacket of the round caused a large loss of polyurea material as a result. The CIP measurement for 0.5 inch of polyurea on the metal sheet was calculated to be 96 ft/s/in.

Table 3 shows the measured results for the comparative basalt fiberglass test sample:

TABLE 3

| Shot # | Velocity (ft/s) | Penetration Result |
|---|---|---|
| 1 | 3088 | Complete |
| 2 | 3050 | Complete |
| 3 | 2980 | Partial |
| 4 | 2976 | Partial |
| 5 | 3023 | Complete |

For this comparative metal/polyurea sample, the following were calculated:

| High Partial | Low Complete | V50 | V50 for 0.631 inch TC-128 |
|---|---|---|---|
| 2980 | 3023 | 3015 | 2839 |

Overall, this comparative sample performed quite well, comparable to TC-128 steel samples (of standard thickness) alone. The polyurea was allowed to re-seal to a certain extent; however, the rigidity of the basalt layer appeared to cause unwanted deformation within the polyurea structure that prevented the most effective re-sealing possibilities. The CIP for this sample was calculated to be 227.68 ft/s/in.

Table 4 shows the measured results for the inventive test sample:

TABLE 4

| Shot # | Velocity (ft/s) | Penetration Result |
|---|---|---|
| 1 | 3075 | Complete |
| 2 | 2966 | Complete |
| 3 | 2952 | Partial |
| 4 | 2960 | Partial |

For this comparative metal/polyurea sample, the following were calculated:

| High Partial | Low Complete | V50 | V50 for 0.631 inch TC-128 |
|---|---|---|---|
| 2980 | 2966 | 2995 | 2822 |

By far, the inventive sample provided the best re-sealing results. The point of impact closed very quickly and the fabric layers remained resilient to prevent debris from the round from affecting the strength and performance of the polyurea, as well. The CIP measured to be 221.79 ft/s/in.

Conclusions

The desired results for any such ballistics protective system would be to accord the highest CIP measurement coupled with the quickest and most reliable resealing of the polyurea constituents. Clearly, the TC-128 steel alone lacks protective capability to the same degree as the inventive and other samples tested. Importantly, though, is the realization that polyurea alone tends to provide initial protection, but lacks the ability to properly reseal around the impact point thereafter. Likewise, although the basalt fiberglass comparative example provided excellent results in general, the ability of debris from a projectile to further harm the polyurea to the point that re-sealing (and thus the ability to prevent leakage or gas escape in such a circumstance) is deleteriously effected. The high CIP coupled with the nearly instantaneous re-sealing accorded the inventive sample, due primarily to the tri-axial weave quasi 3D fabric coupled with the polyurea layers, thus provides the best manner of protecting rail car and tanker walls. In actuality, the presence of the single layer of the 3D fabric sample within the comparative sample allowed for reduced propensity for polyurea delamination therefrom in comparison with the basalt fiberglass layer (and other types of fabrics). The resultant benefits of structural resiliency, dimensional stability (even under drastic, penetrative forces), and lamination strength (with the polyurea) shows the unexpectedly effective qualities of utilizing such a specific weave of fabric within a ballistics protective system. Furthermore, the ability to retrofit such structures with composites of these materials is thus highly desirable and enticing as the means to best protect such structures from ballistics and other potentially explosive and/or destructive occurrences can be achieved through such a simple procedure.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A multilayer composite including at least two layers of a triaxial weave quasi three-dimensional fabric and at least two layers of polyurea with at least one such polyurea layer disposed between said at least two fabric layers and one polyurea disposed external to said triaxial weave quasi three-dimensional fabrics.

2. The composite of claim 1 wherein each fabric layer is impregnated with an epoxy material.

3. A metal wall structure including a base external metal material to which said composite of claim 1 is adhered directly at one layer of said triaxial weave quasi three-dimensional fabric.

4. A metal wall structure including a base external metal material to which said composite of claim 2 is adhered directly at one layer of said triaxial weave quasi three-dimensional fabric.

5. A method of applying such a composite to a metal wall structure including the steps of providing the composite of claim 1, providing a metal wall structure, applying an adhesive to the external fabric layer thereof, and securing the composite to the metal wall structure through interaction with the applied adhesive.

\* \* \* \* \*